United States Patent [19]
Davis

[11] Patent Number: 5,146,502
[45] Date of Patent: Sep. 8, 1992

[54] SPEECH PATTERN CORRECTION DEVICE FOR DEAF AND VOICE-IMPAIRED

[75] Inventor: Stephen A. Davis, Coral Springs, Fla.

[73] Assignee: Davis, Van Nortwick & Company, Gainesville, Fla.

[21] Appl. No.: 484,877

[22] Filed: Feb. 26, 1990

[51] Int. Cl.[5] ............................................. C10L 8/04
[52] U.S. Cl. .................................... 381/43; 434/112; 434/116
[58] Field of Search .................... 381/41–45; 364/513.5; 379/52; 434/112, 116

[56] References Cited

U.S. PATENT DOCUMENTS

| | | | |
|---|---|---|---|
| 3,649,765 | 3/1972 | Rabiner et al. | 179/15 A |
| 3,828,132 | 8/1974 | Fanagan et al. | 179/1 |
| 3,883,850 | 5/1975 | Martin et al. | 381/43 |
| 4,107,462 | 8/1978 | Asija | 179/1 |
| 4,355,302 | 10/1982 | Aldefeld et al. | 381/43 |
| 4,424,415 | 1/1984 | Lin | 381/39 |
| 4,516,215 | 5/1985 | Hakaridina et al. | 381/43 |
| 4,581,756 | 4/1986 | Togawa et al. | 381/43 |
| 4,589,138 | 5/1986 | Milner et al. | 381/110 |
| 4,618,984 | 10/1986 | Das et al. | 381/43 |
| 4,661,915 | 4/1987 | Ott | 381/41 |
| 4,708,657 | 11/1987 | Beller et al. | 434/185 |
| 4,720,862 | 1/1988 | Nakata et al. | 381/38 |
| 4,769,846 | 9/1988 | Simmons | 381/51 |
| 4,788,649 | 11/1988 | Shea et al. | 364/513.5 |
| 4,809,329 | 2/1989 | Walliker et al. | 381/36 |
| 4,831,551 | 5/1989 | Schalk et al. | 364/513.5 |
| 4,908,845 | 3/1990 | Little | 364/513.5 |

OTHER PUBLICATIONS

The Scott Coretechs Technology, "Speech Recognition", pp. 1–8 no date available.
L. A. Smith et al, "Template Adaptation in a Hypersphere Word Classifer", pp. 1–5, no date available.
Brian L. Scott et al, "Reducing the Distinction Between Speaker Independence and Dependence", pp. 1–4, no date available.
L. R. Bahl et al, "Large Vocabulary Natural Language Continuous Speech Recognition", 5 pages, no date available.
A. Averbuch et al, "Experiments With the Tangora 20,000 Word Speech Recognizer", pp. 1–5, no date available.
Rear Admiral Paul E. Tobin, Jr., "On the Future of Voice Technology in Military Applications", Apr.-/May 1990, pp. 76–78.
Lalit R. Bahl et al, IEEE Transactions on Pattern Analysis and Machine Intelligence, "A Maximum Likelihood Approach to Continuous Speech Recognition", vol. PAMI-5, No. 2, Mar. 1983, pp. 179–190.
A. Averbuch et al, IBM Research Division, "An IBM PC Based Lage-Vocabulary Isolated-Utterance Speech Recognizer", Jan. 28, 1986, 7 pages.
Lalit R. Bahl et al, IBM Research Division, "A Method for the Construction of Acoustic Markov Models for Words", Sep. 3, 1987, 13 pages.
Jordan R. Cohen, IBM Thomas J. Watson Research Center, "Application of an Auditory Model to Speech Recognition", Jan. 23, 1989, pp. 2623–2329.
"Automatic Speech Recognition of Imparied Speech" by Gloria Stevens Carlson and Jared Bernstein, pp. 189–191, Proceedings of a Conference at Gallaudet University, Sep. 1988.
"Applications of Speech Recognition Technology in Rehabilitation" by Jared Bernstein, pp. 181–187, Proceeding of a Conference at Gallaudet University, Sep. 1988.

Primary Examiner—Dale M. Shaw
Assistant Examiner—Michelle Doerrler
Attorney, Agent, or Firm—Foley & Lardner

[57] ABSTRACT

A portable voice or speech aid enabling a deaf or voice impaired user to make sounds into a microphone to output intelligible speech through a built-in speaker or to a text display screen.

19 Claims, 10 Drawing Sheets

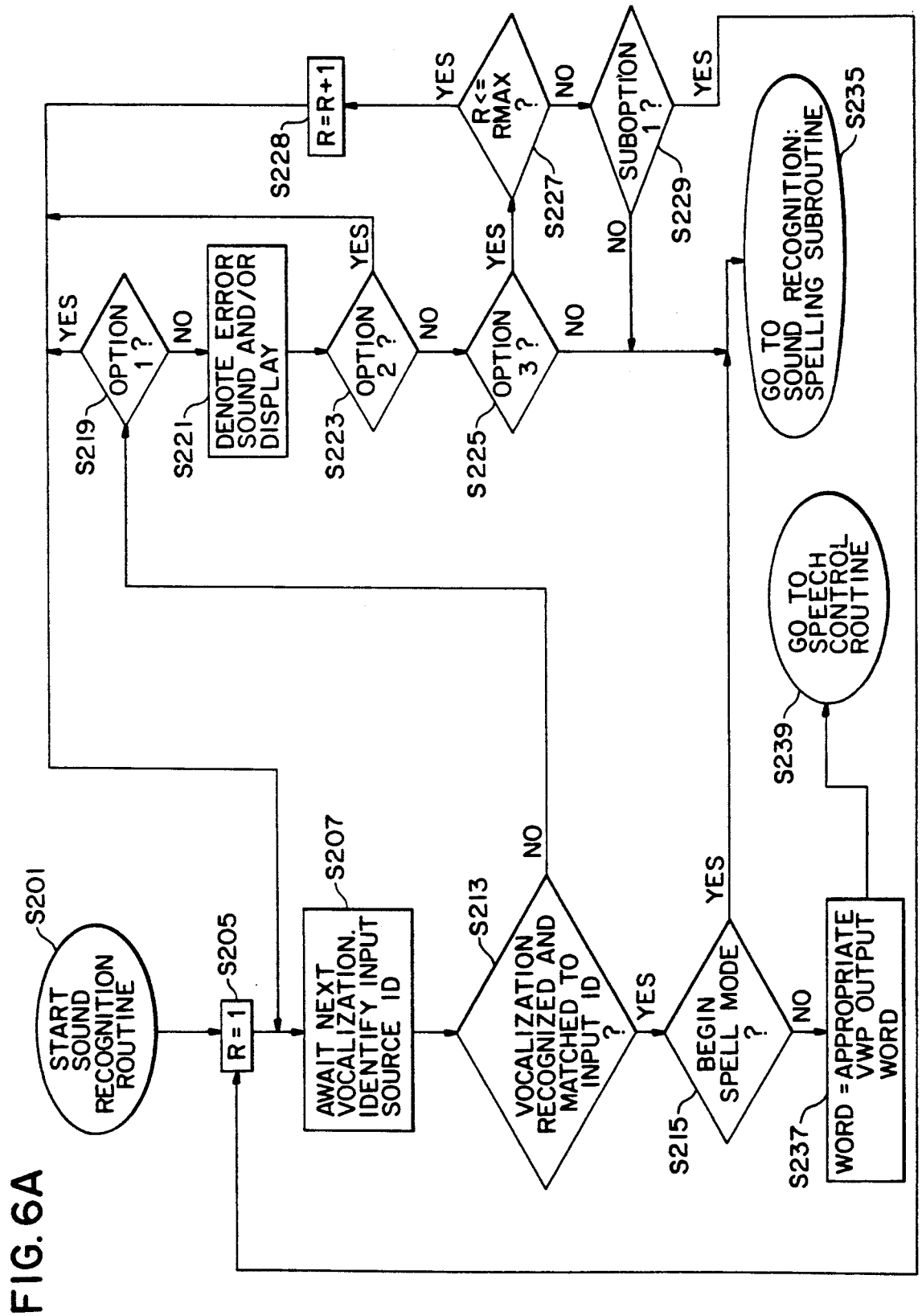

SPEECH PATTERN CORRECTION DEVICE FOR DEAF AND VOICE-IMPAIRED

BACKGROUND OF THE INVENTION

1. Field of the Invention

This invention relates to computer aided devices enabling deaf or voice-impaired people to communicate.

2. Description of the Related Art

Computer aid devices for deaf or voice-impaired persons fall into two categories. The first type avoids the need for the production of speech. For example, a computer can interpret hand positions signed by deaf people, or can allow deaf people to type messages which can be transmitted over telephone lines. The second type of device teaches the deaf to speak understandably. But in using the second category, the voice impaired person may not be able to learn to speak understandably, and a deaf person may find learning difficult and time consuming.

For both deaf and voice impaired, the user effort may be extensive and results may be embarrassing. However, it is important to recognize that deaf or voice-impaired people can utter sounds in a reasonably consistent fashion.

SUMMARY OF THE INVENTION

One object of this invention is to provide a speech pattern correction device enabling a deaf or voice-impaired person to verbalize clearly with minimal learning effort utilizing the consistent sounds which he or she can easily make.

It is another object to create a speech pattern correction device that is light, portable and easy to carry about. The device is small in size by virtue of the voice recognition and speech synthesis hardware used.

It is another object to provide a speech pattern correction device which people can use in most situations, for example, at home, at work, on the telephone, in meetings or conferences, and on the street or in conveyances.

It is another object to provide a speech pattern correction device with output controls for pitch, volume, and voice quality, so that speech generated can be at any desirable volume.

It is another object to provide an option to enable users to read the words spoken into the system.

It is another object to provide a device which operates as close as possible to real time, at normal rates of connected speech.

It is another object to provide a device with an ancillary use as an emergency alarm. For example, the device may have a "red button" with user defined voice or sound output.

The above objects are met with the present speech pattern correction device. The speech pattern correction device enables a user to make sounds into a microphone as quietly as he or she chooses and output intelligible speech through a built-in speaker or to a text display screen. The device is pocket sized, yet is attachable to a stationary computer to allow user defined updates to be made from a keyboard. The device also has a modem connection to allow telephone communications. The device also contains an emergency alarm activated by a button.

BRIEF DESCRIPTION OF THE DRAWINGS

Further details of the present invention are explained with the help of the attached drawings in which:

FIG. 6A shows a flow chart for the Sound Recognition Routine;

DESCRIPTION OF THE PREFERRED EMBODIMENTS

Figure 1:
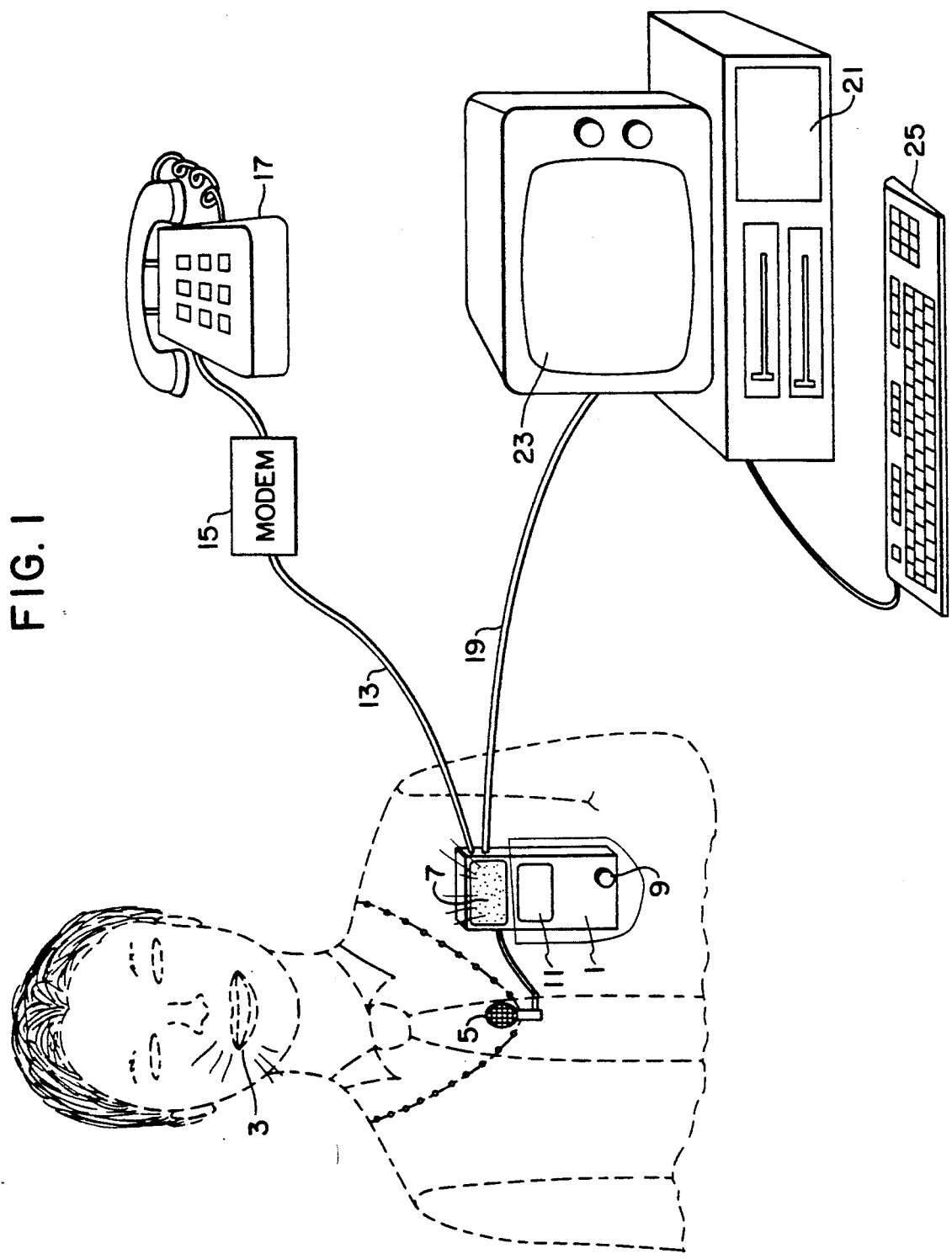
FIG. 1 shows the speech pattern correction device full system configuration.

FIG. 1 shows the full system configuration. The full configuration first consists of a portable speech pattern correction device 1 which uses a microphone 5 to receive a person's voice 3 and output corrected speech through a speaker 7. The microphone 5 is small and can be worn around the user's neck. The portable device 1 also includes a microprocessor, a 40 character width monochrome display screen 11 so that a deaf person can read the output, an emergency alarm button 9, a modem cable 13, and a stationary computer (CPU) cable 19.

The portable device 1 uses miniaturization to enable one to carry it in a pocket, or attach it to a belt buckle. From this position the intended speech can be produced and monitored by the user. The device is lightweight so as to be no burden for the user to carry.

The modem cable 13, allows the voice impaired person to make and receive phone calls through a modem 15 from the portable device over a telephone 17. Phone conversations can take place with both audible and screen-displayed words available at both telephone outlets if two voice-impaired people are speaking. Also, one person with a single apparatus can communicate by telephone by directing the computer generated speech output into his telephone receiver. Also, a deaf person may store a "voice-word profile" of a person with whom he or she frequently speaks, and at the time of the incoming phone message, the portable display 11 allows the deaf person to receive the message.

The portable device 1 can also run more than one profile at a time, thus enabling two or more users to converse on one apparatus. Both users can speak into the same microphone, or through multiple microphones. In each case, the word output to the speaker 7 or to the portable display 11 can be generated for each user separately. When speaking into the same microphone, the sound quality allows separation of the sounds when, as in a typical conversation, people interrupt or overlap their voices.

The stationary CPU cable 19 allows a stationary CPU 21 to be used as the central processor in place of the microprocessor of the portable device 1. The stationary display 23 also allows a larger screen to display monochrome characters for the voice impaired person to read instead of the portable display 11. A keyboard 25 is provided to enable the voice-impaired person to redefine user controlled options to be loaded into the portable speech pattern correction device.

Figure 2:
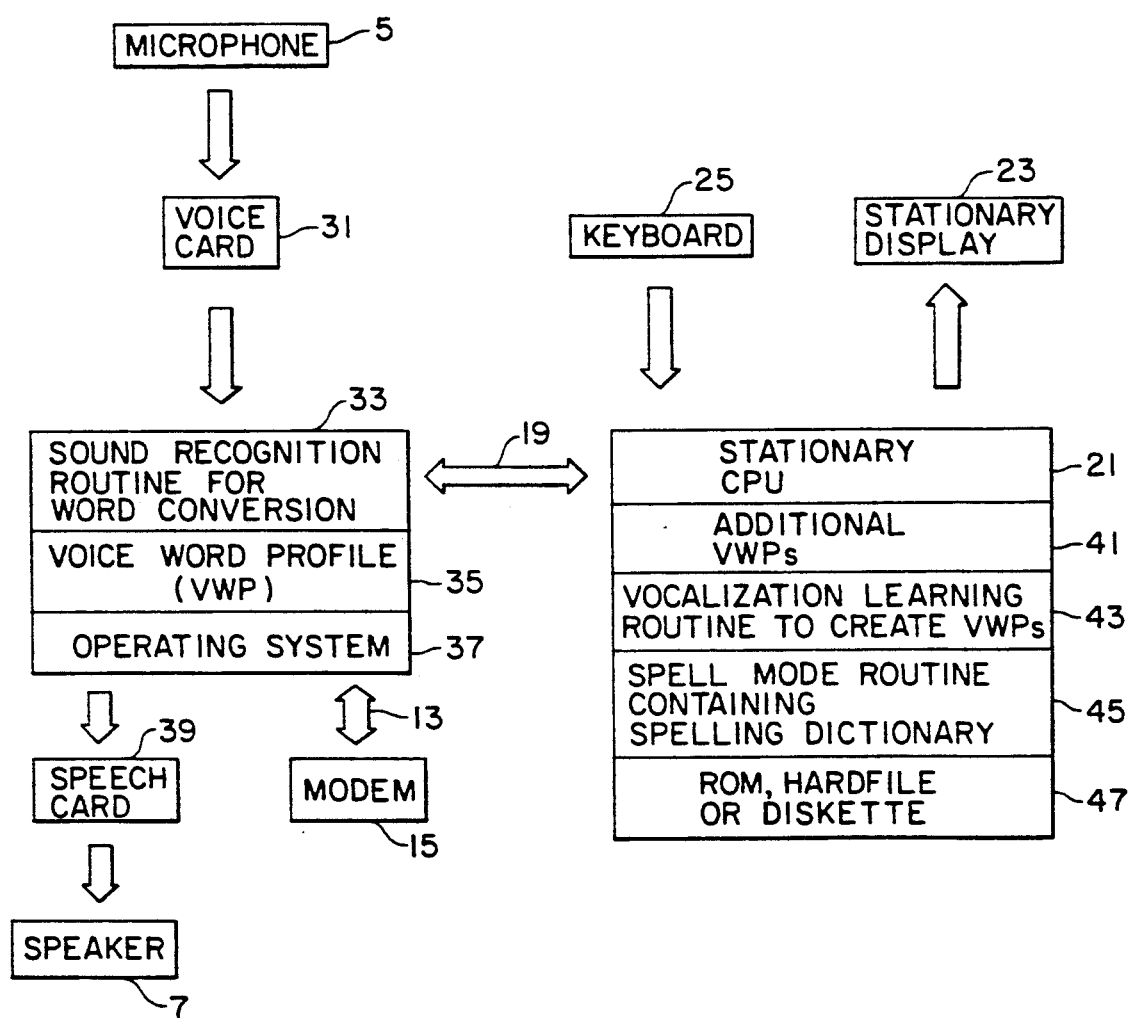
FIG. 2 shows a full diagram of the portable and stationary devices

FIG. 2 shows a full diagram of the portable and stationary devices. As shown in FIG. 1, the portable speech system is separated by the stationary cable 19. Also, the modem 15 is shown separated by the modem cable 13.

The portable speech pattern correction device generally contains all of the components shown to the left of the CPU cable 19 in FIG. 2. The portable device receives a voice from microphone 5 and outputs a signal over the speaker 17. It will be understood that several different inputs may be available with the input or inputs to be used designated by the user, as will be explained below. Internally, the portable device contains a voice card 31 which one or more voice word profiles (VWP) 35 defined for individual users and a sound recognition routine 33 to convert the users' voices. An operating system 37, then controls the entire process, outputting the corrected words to a speech card which converts the words to be output to a speaker. One currently available speech card is the Personal Reader from Kurzweil Computer Products.

The software operating system 37 can be any standard operating system, but a multi-tasking capability is required if the handling of more than one real-time vocalization to speech conversion is to occur simultaneously. Operating systems such as DOS with Microsoft Windows, or OS/2 would be suitable.

The stationary CPU generally contains all the components shown to the right of the CPU cable 19 in FIG. 2. The stationary system contains additional VWPs 41 so that multiple users can use the system. The stationary CPU also allows vocalization learning to create more VWPs 43 so that the VWPs can be kept up to date as the users vocabulary changes. To enable the VWPs to be updated, or mispronounced words to be identified, a spelling dictionary 45 is used. The stationary system also contains a ROM, hardfile, or a diskette 47 for additional data storage capacity to accommodate software allowing the user to define special options. The stationary CPU has an attached keyboard 25 to allow these user defined updates, and a standard display 23 for larger size, more readable text.

The ROM, hardfile or diskette 47 contains data sets which can be specifically referenced by the software routines. A hard file or ROM is preferable but diskettes can suffice to store these data sets. The following data sets, the function of which will become clearer as the present description continues, are inputted through the keyboard and stored in memory 47:

Set 1—selects word output routing to the speech card, to the portable display, or to a modem; sets speech card levels for pitch, volume, and voice quality and emergency alarm volume, speed, and repetition number. The specific keyboard inputs are as follows:
ID1—Voice output ON/OFF
ID2—Screen output ON/OFF
ID3—Modem output ON/OFF
SPV—Speech control vector—contains pitch, volume, voice quality, alarm volume, alarm speed, alarm description, number of alarm repetitions.

Set 2—designates which VWPs are to be loaded into memory and/or into the portable device and to which input device each one is assigned. The specific keyboard inputs are as follows:
NMAX—number of VWPs to be loaded
VWPINPUT(n)—Name of "n"th VWP to be loaded
KMAX—Number of sound input sources.
INPUT(n)—Indicates which input source is assigned to VWPINPUT(n). For example, INPUT(n) k indicates that VWPINPUT(n) receives its input from microphone "k".

Set 3—Learning mode ON/OFF.

Set 4—Alarm ON/OFF.

Set 5—Sets options 1, 2, 3, or 4 for unrecognized vocalizations. When vocalizations are not recognized, the options available are:
1. Ignore and keep going.
2. Identify (sound and/or display) and keep going.
3. Identify sound and/or display and wait for a repeat vocalization.
4. Identify (sound and/or display) and wait for spelling.

Set 6—Indicates number of repetitions of a vocalization under option 3 before a suboption is chosen. Specific inputs are:
RMAX—specifies number of repetitions. SUBOPTION—option 1 or 4 is selected.

In addition to the foregoing keyboard entries which may be input each time the software of the invention is run, the following data sets are stored:

Set 7—SPELLING DICTIONARY fields. This is a spelling dictionary containing both correct and phonetic spellings which include all the words included in all the VWPs.

Set 8—VWP fields. Each VWP is stored as a VWPNAME(j) where JMAX is the number of VWPs stored. Each word entered in each VWP is stored with the following fields: Vocalization nomenclature, vocalization data, and output word spelling.

Figure 3:
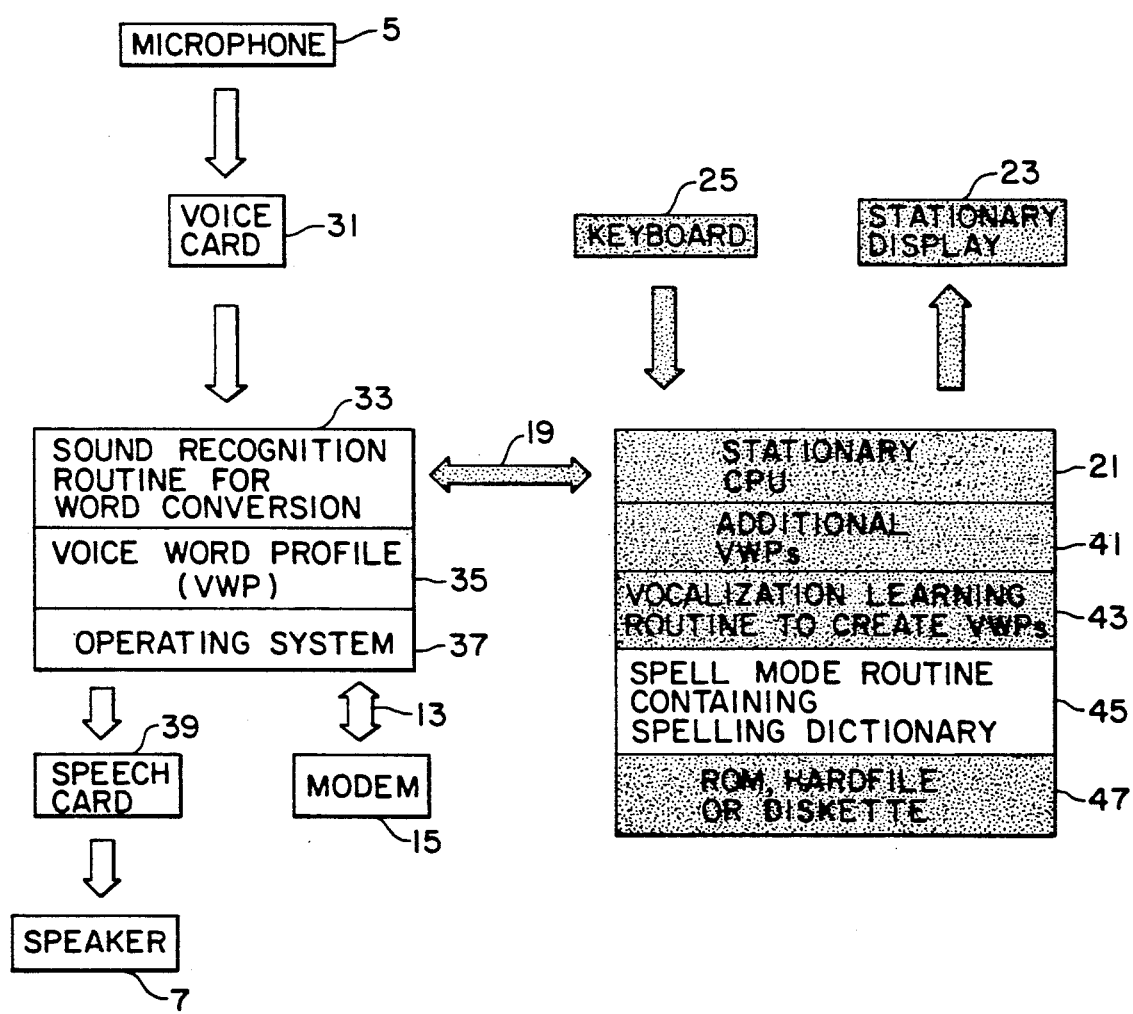
FIG. 3 shows the diagram for a portable speech pattern correction device separate from a stationary device.

FIG. 3 shows the diagram for a portable speech pattern correction device when separated from the stationary speech pattern correction device. The components which are removed are shown shaded in, and basically include all components attached through the stationary CPU cable 19. Prior to detaching the stationary CPU cable 19, the portable apparatus must load the following to operate:
1. The six data sets stored on the hard file as previously described.
2. The spelling dictionary.
3. A subset of the VWPs to be used.

Figure 4:
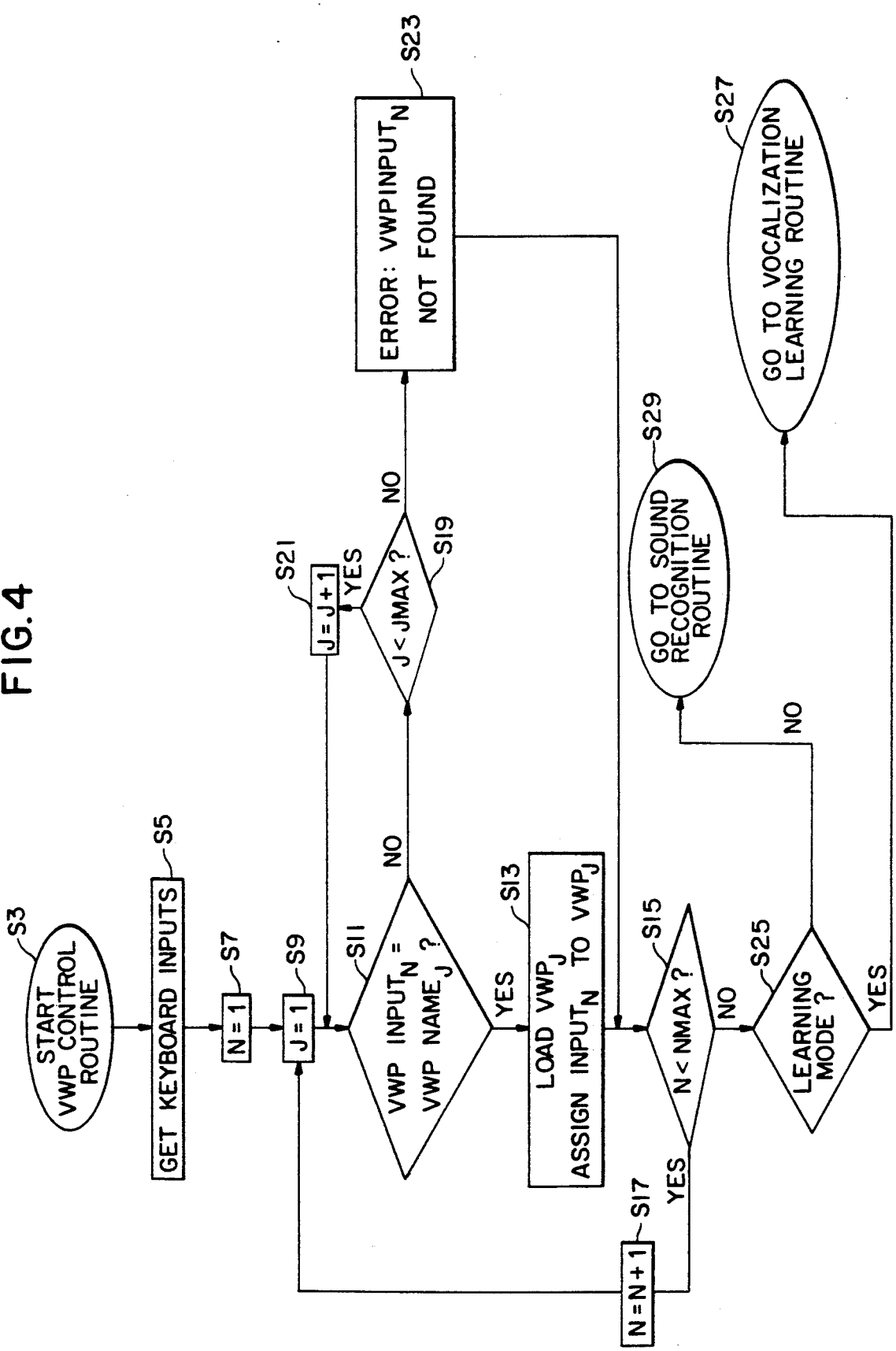
FIG. 4 shows a flow chart for the Voice-Word Profile (VWP) control routine.

FIG. 4 shows a flow chart for the Voice-Word Profile (VWP) control routine. The VWP control routine is an application routine which initiates operation of the entire system.

The VWP Control Routine starts in step S3. The VWP Control Routine begins by accepting necessary inputs and initializing variables. Each of the inputs associated with Sets 1-6 can be input or updated in any convenient manner, such as by user prompt, direct input, or the like in step S5. Default settings can be defined for inputs of sets 1 and 3-6. Set 2 is preferably loaded for each use in order to make clear which VWP is to be loaded and which microphone(s) is to be used.

In steps S7 and S9, variables N and J are initialized to 1.

Step S11 checks to assure that the first VWP identified by the input VWPINPUT(1) is in fact the name of a VWP already stored. This is accomplished by comparing the input name to the first stored VWP name, designated VWPNAME(j). If the names match, the routine loads and stores the designated VWP(j) and assigns the first INPUT(n) designating an input device to the loaded VWP(j). The VWP control routine then checks in S15 to see if additional VWPs are to be loaded. This is accomplished by comparing N to the input variable NMAX. If N is less than NMAX, N is incremented by 1 in S17 and control returns to S9.

If in step S11, it is determined that VWP(j) does not match the name of the input VWP to be loaded, control passes to step S19 where a check is made to assure that all VWP names have not been compared for a match. JMAX indicates the number of VWPs stored If J is less than JMAX, J is incremented in S21, and control is returned to S11 to compare the input name to the next stored VWP name. If J exceeds JMAX, an error is reported in S23 and control is returned to S15 to increment to another VWP.

Figure 5:
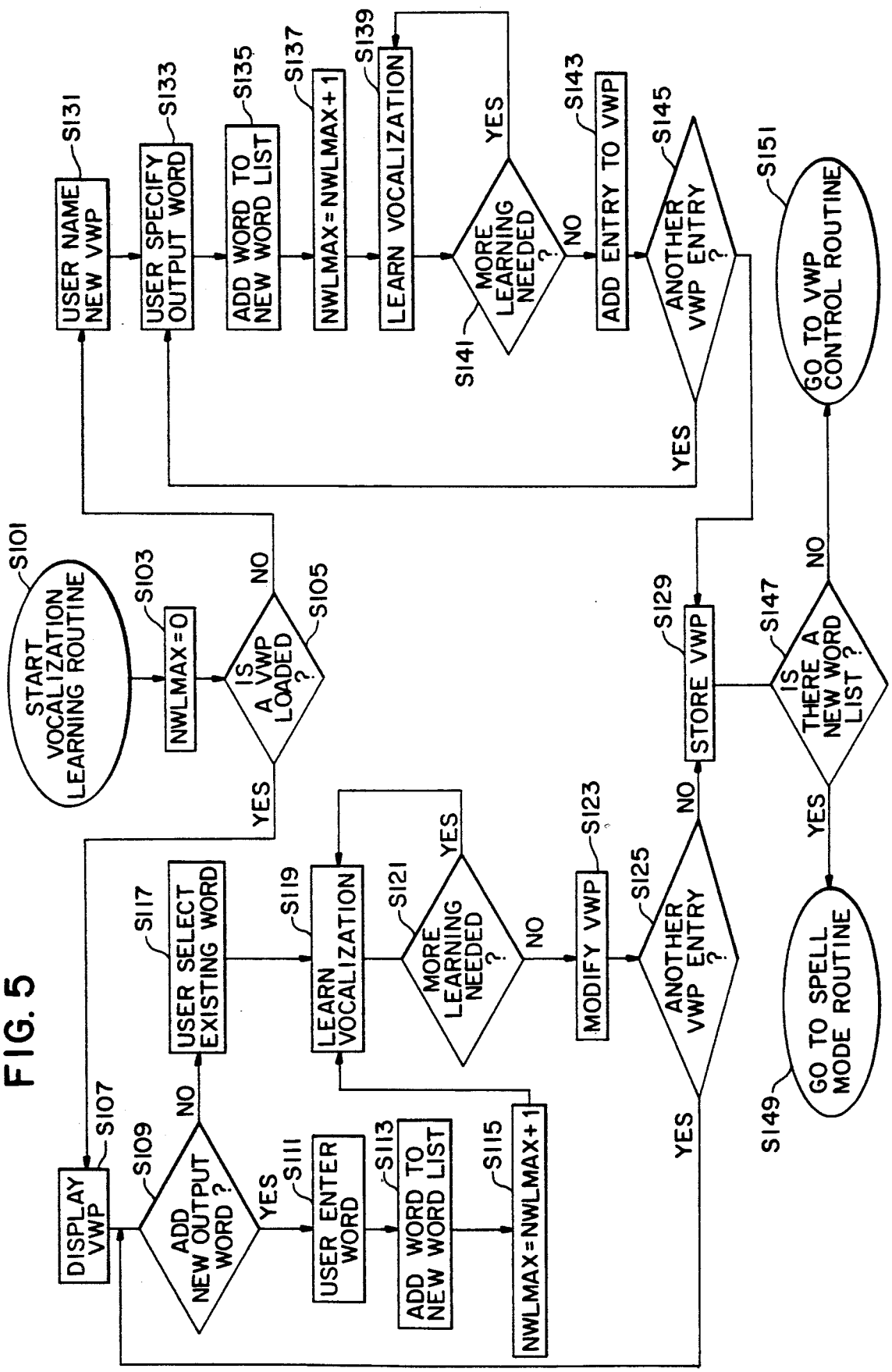
FIG. 5 shows a flow chart for the Vocalization Learning Routine.

Once all VWPs are loaded and matched with inputs, in S25 a check is made to determine if the learning mode has been selected. This is accomplished by determining if Set 3 shows an ON or an OFF. Learning mode should be selected by the user if a additional VWPs need to be created or existing VWPs must be updated by adding new words or correcting vocalizations of learned words. If the learning mode has been selected, the Vocalization Learning Routine of FIG. 5 is entered in step S27. Otherwise we proceed in S29 to the Sound Recognition Routine of FIG. 6A to await a voice input.

FIG. 5 shows a flow chart for the Vocalization Learning Routine. The Vocalization Learning Routine allows new VWPs to be created or old VWPs to be updated.

The Vocalization Learning Routine starts in step SIOI and control passes to step S103 where variable NWLMAX, used to count the number of words loaded in a VWP, is initialized to zero. Step S105 sends control to S131 if a VWP is being created from scratch, or to S107 if an old VWP is being updated.

If an old VWP is being updated, that VWP is displayed in S107. In S109 the user identifies whether an input vocalization will be stored to update an old word already in the VWP, or whether a new word is being added. If a new word is being added in S109, the user types in the word in S111, the typed word is added to the word list in S113, and the total word count NWLMAX is incremented in S115 before the word is learned in S119. If an old word is being updated in S109, the user selects the word from the current word list in S117 before the new vocalization for the word is learned in S119.

Learning in S119 allows the user to vocalize the typed in word. The computer prompts the user to repeat the word in S121 until the word is correctly learned by the computer. The number of repetitions is determined by the voice recognition system being used. A suitable system is the Voice Master Key available from Covox, Inc. This particular system includes a combination of microphone, voice card and software. If no more learning is required in S121, the new word is added to the VWP in S213. Finally, in S125 a user, upon being prompted by the computer, may opt to continue adding or updating words by returning control to S109. Otherwise, if the VWP is complete, control goes to S129 to store the VWP update.

If a new VWP is being created as determined in S105, that VWP is named by the user in S131. A word is then typed in S133, added to a word list in S135, and the total word count NWLMAX is incremented. The user can then vocalize the typed in word in S139. The computer then prompts the user to repeat the word in S141 until the word is correctly learned by the computer. If no more learning is required in S141, the word is added to the new VWP in S143. Finally, in S145 a user, when prompted by the computer, may opt to continue adding new words by returning control to S133. Otherwise, if the VWP is complete, control goes to S129 to store the VWP update.

Figure 7B:
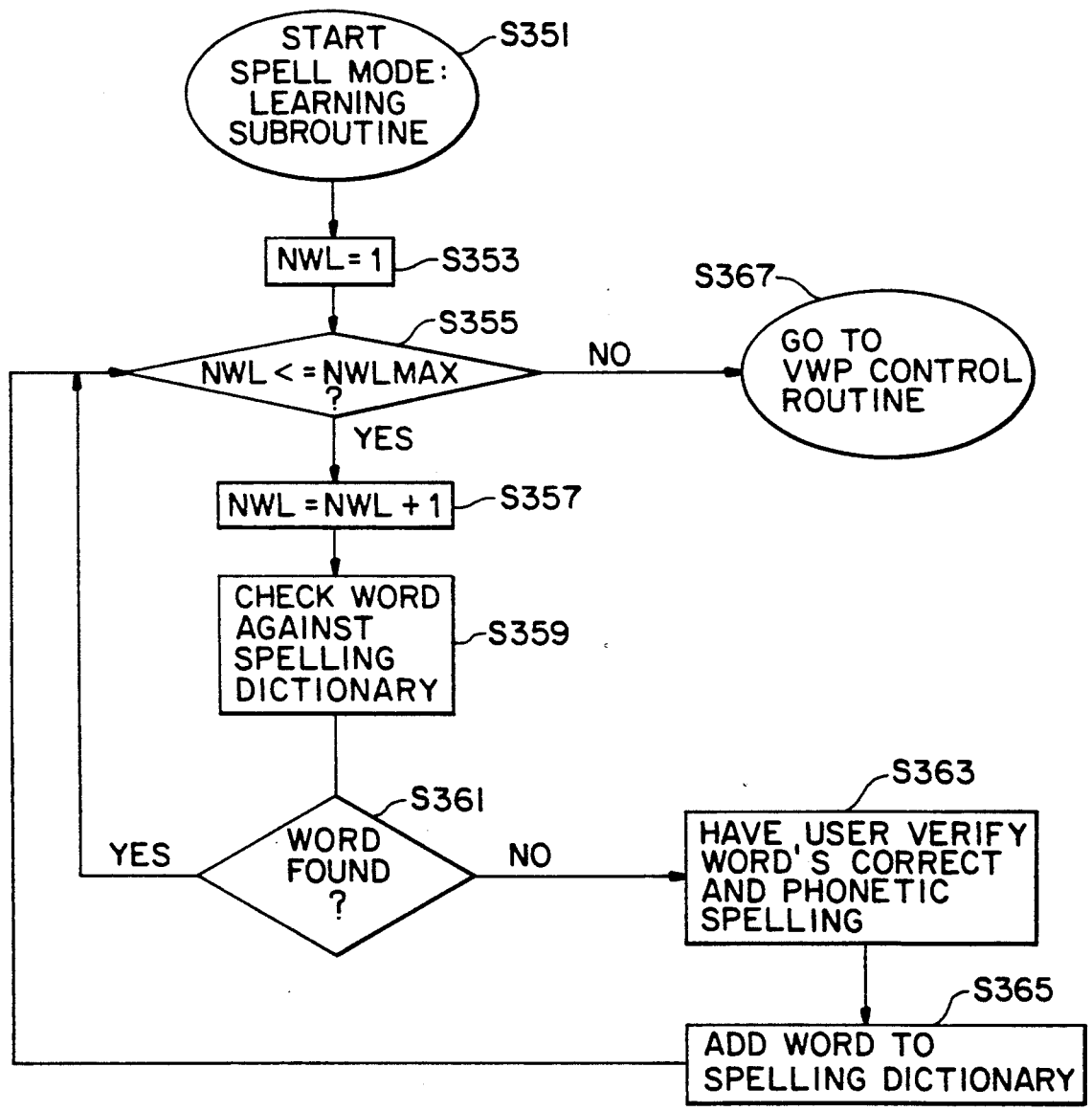
FIG. 7B shows a flow chart for the Learning Subroutine of the Spell Mode Routine.
Figure 7A:
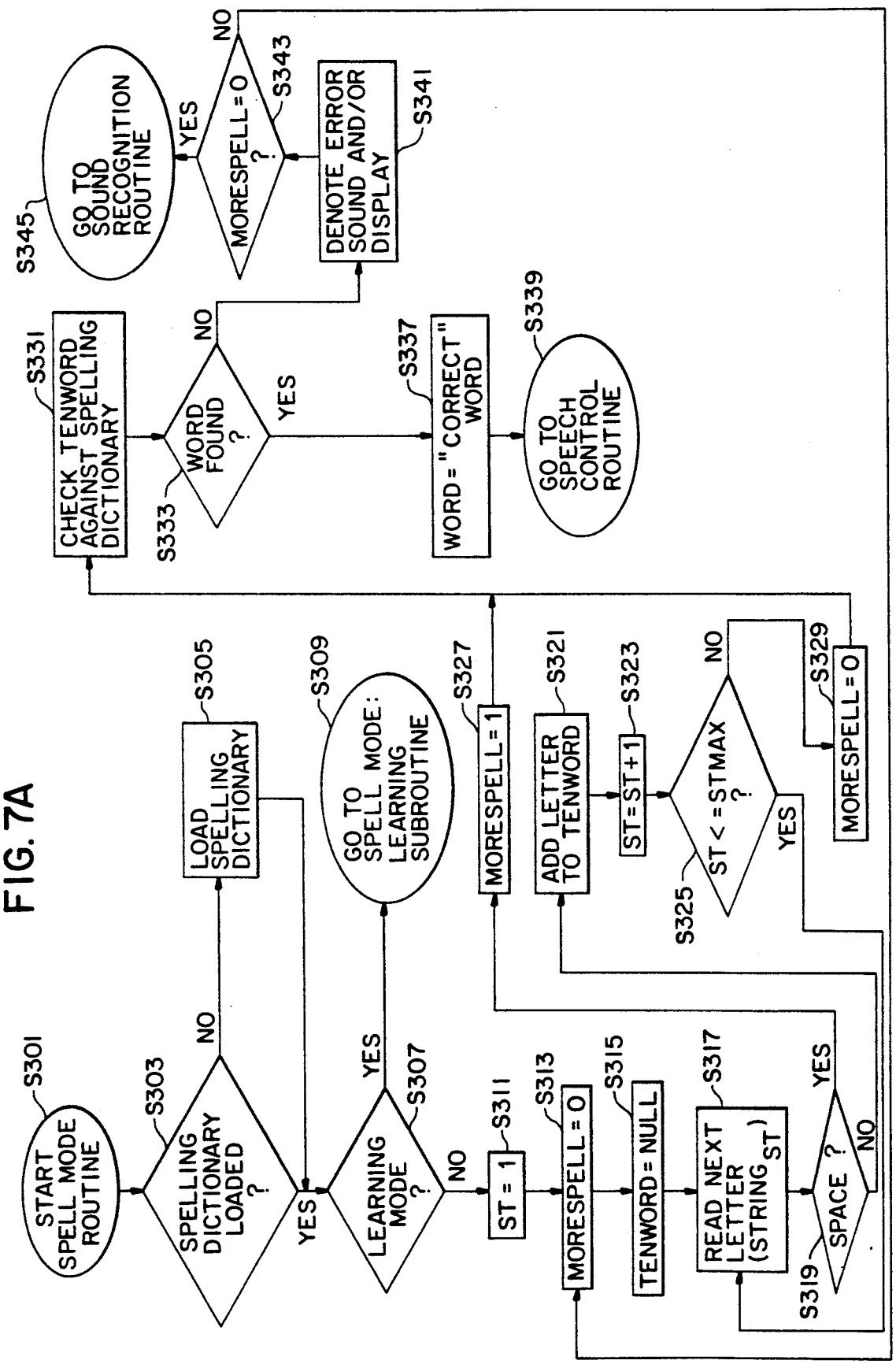
FIG. 7A shows a flow chart for the Spell Mode Routine.

When new words have been typed in as determined in S147 by checking to see if NWLMAX is greater than 0, the Vocalization Learning Routine in step S149 sends control to the Spell Mode Routine of FIG. 7A to check the words against the spelling dictionary. If no new words have been typed in, control in S151 is returned to the VWP Control Routine of FIG. 4.

From step S149 in FIG. 5, control passes to step S301 in FIG. 7A, which starts the spell mode routine. From here control passes to step S303 which checks to see if the spelling dictionary has been loaded. If not, control passes to step S305 which loads the dictionary. When the dictionary is loaded, control passes to step S307 where the routing checks to determine if the learning mode has been selected. As before, this is determined by looking at the status of Set 3 to see if the learning routine variable is ON or OFF. In the present case, the learning mode has been entered and control passes to step S309 which enters the Spell Mode: Learning Subroutine, shown in FIG. 7B.

Control starts at step S351 in FIG. 7B and passes to step S351 where the variable NWL is initialized to 1. Control then passes to step S355 where it is determined if NWL is less than or equal to NWLMAX, it being remembered that NWLMAX is the number of words added to the new word list. If NWL is greater than the number added to the new word list control passes to step S367 and returns to the VWP Control Routine.

If the answer in step S355 is YES, control passes to step S357 where NWL is incremented by 1. Control then passes to step S359 where the next word in the list is compared against the spelling dictionary. In step S361 if the word is in the dictionary, control returns to step S355. Otherwise, control passes to step S363 where the user verifies the correct and phonetic spelling of the word. In step S365, the word is added to the spelling dictionary. Control then returns to step S355.

The vocalization learning routine of FIG. 5 can be a separate packaged system. A set of sounds in a VWP can represent words as well as special characters such as letters of the alphabet or control characters to initiate or end a program routine. The sounds themselves are determined by the user's individual preference, or the sounds could be defined by a predetermined utterance set.

The deaf community might determine a standardized set of VWPs to minimize the effort for a deaf person to learn this "utterance set".

One problem of voice recognition is distinguishing among words with identical sounds such as "to", "too", and "two". This problem can be solved if the user defines a different vocalization to represent each word.

FIG. 6A shows a flow chart for the Sound Recognition Routine The Sound Recognition Routine starts at step S201. The Sound Recognition Routine functions by awaiting a word to be vocalized and then matching the vocalized word to a VWP entry.

Variable R is initialized for the Sound Recognition Routine in step S205. This variable, which determines the number of times that option 3 has looped, is set as 1 in S205.

The Sound Recognition Routine next remains at S207 awaiting a vocalization input. A microphone, or telephone receives the input vocalization. The input vocalization is directed to a voice card which works in conjunction with the Sound Recognition Routine. As mentioned above, the combination of microphone, voice card, and software is often packaged as a voice recognition system such as a Voice Master Key available from COVOX, Inc.

Once a vocalization is received, Step S213 checks for a match to the vocalized word in the VWP. If a match is found, the step S215 checks to determine if the vocalization is "Begin Spell Mode". The user may vocalize in step S213 a previously learned "Begin Spell Mode" character which is recognized in step S215. If Spell Mode is selected in S217, the sound recognition spelling subroutine is called. If spelling is not required, S237 stores the current word which matches the identified vocalization in the register "WORD" as the VWP output, and sends control in S239 to the Speech Control Routine of FIG. 8 which directs the output to a speaker, a screen or a modem as will be discussed below.

If the vocalization in S213 is unrecognized, one of four options is followed, as indicated by the data in Set 5. It will be recalled that this set was input at the start of the VWP control routine. These options include:

Option 1 (S219). Ignore the unrecognized vocalization and return to await a next vocalization in S207. Choosing this option allows simulation of what happens in normal conversation, where unidentified utterances are usually implied by the surrounding context.

Option 2 (S223). Identify the error by sound and/or display in S221 and return for a next vocalization in S207.

Option 3 (S225). Identify the error by sound and/or display in S221, and as long as R is below a maximum RMAX in S227, increment R in S228 and wait for a repeat vocalization in S207. The variable R must be used because, as the same sound is repeated, nonrecognition could continue indefinitely. A user designated maximum number RMAX and suboption selection are used to prevent an infinite loop by sending control in S229 either back through S205 to await a new word in S207, or to option 4 for the mispronounced word. It will be recalled that RMAX was set and a choice between suboption 1 and suboption 4 was made by the user as part of Set 6 as part of the VWP control routine.

Option 4 (S235). Identify the error by sound and/or display in S221 and send control to the Sound Recognition Spelling Subroutine S235 to await spelling. Having defined this option, the user will understand based on the sound and/or display that subsequent vocalizations will be presumed to be spelling without the user needing to vocalize the "Begin Spell Mode" character.

Figure 6B:
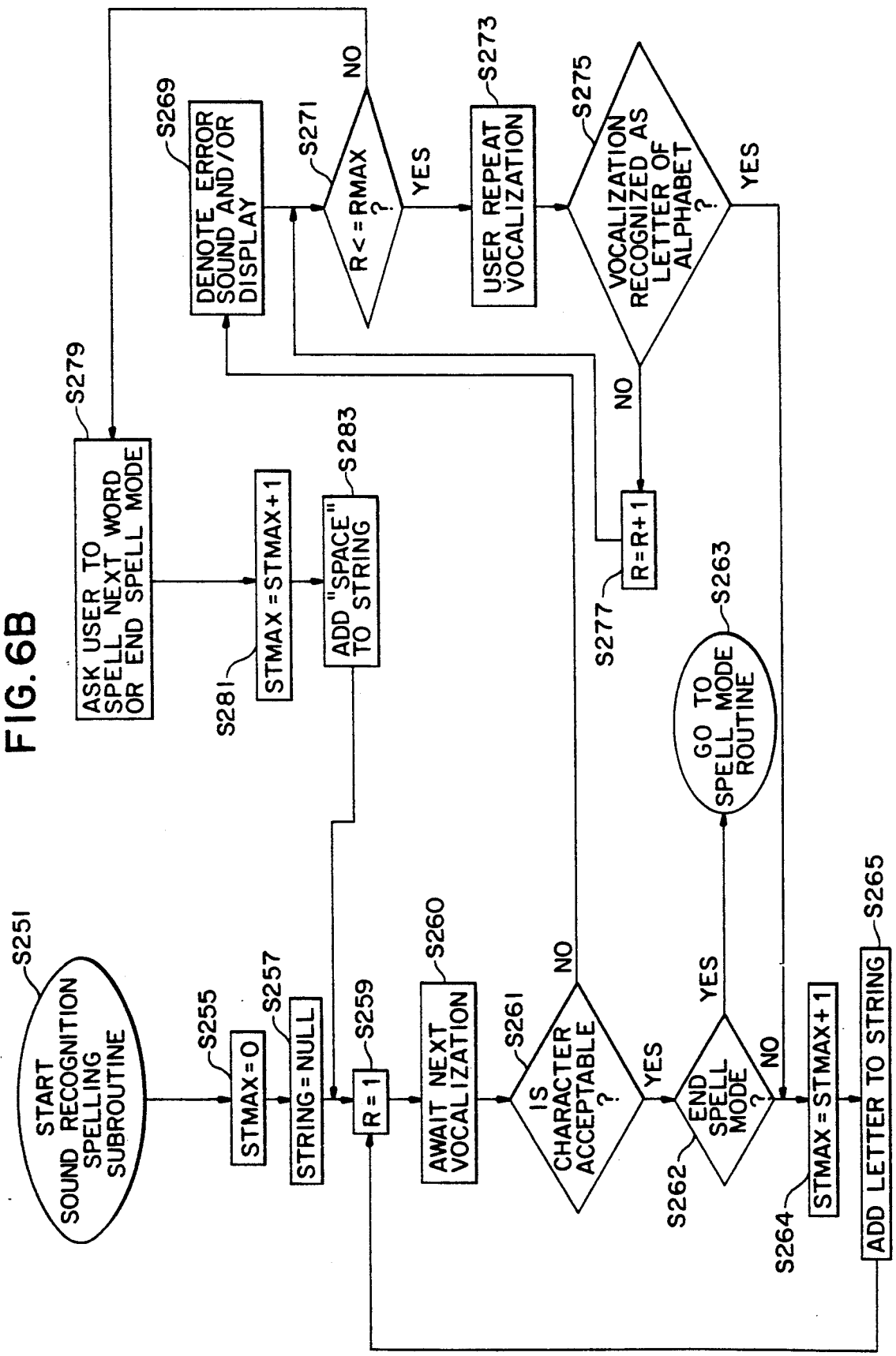
FIG. 6B shows a flow chart for the Spelling Subroutine of the Sound Recognition Routine.

FIG. 6B shows a flow chart for the Spelling Subroutine of the Sound Recognition Routine. The Spelling Subroutine is called from FIG. 6A option 4 when an unrecognized VWP word must be spelled out and identified from a spelling dictionary as in S235, or when the user options in S215.

The Spelling Subroutine begins with S251 and first initializes variables. The variable STMAX, a count of the characters recognized and added to STRING, is set to 0 in S255. STRING which will contain the spelled word list is cleared in S257. Finally, R, a count of the number of times the same vocalization has been made, is set to 1 in S259.

The Spelling Subroutine next awaits a vocalization in S260. If a vocalized character is recognized in S261, that character is added to STRING in S265, the STMAX, which counts the characters in STRING is incremented in S264, and we return through S259 to S260 to await another vocalization. If the character is recognized as the "End Spell Mode" character in S262, we go to the Spell Mode Routine of FIG. 7A in S263 to verify the spelling in the spelling dictionary. The "End Spell Mode" character is one which was previously learned and input by the user to indicate the end of a spelling string.

If a character is not recognized in S261, an error is denoted in S269, and the user is allowed to repeat the vocalization in S273. If the repeat vocalization is recognized in S275, control is returned to S264 to increment STMAX and then adds that letter to STRING in S265.

If the repeat vocalization is still unrecognized in S275, the counter R is incremented in S277, and control is returned to allow revocalization in S273. Once the counter R surpasses RMAX, control goes from S271 to S279 where the user is notified of the error and told to begin another word or end the spell mode. After step S279, STMAX is incremented in S281, and a space is added in S283 to indicate the end of a word. Control is returned to step S259 where R is initialized to "1" and then control is passed to step S260 where the user will vocalize the End Spell Mode character or begin a new word.

FIG. 7A shows a flow chart for the Spell Mode Routine. The Spell Mode Routine functions by checking each newly typed or vocalized word spelling against the spelling dictionary. As discussed above, the Spell Mode Routine is called when the Vocalization Learning Routine of FIG. 5 has a list of new word spellings typed in by the user. The Spell Mode Routine is also called by the Sound Recognition Spelling Subroutine of FIG. 6B when it has a list of vocalized spellings.

The Spell Mode Routine begins at step S301. If the spelling dictionary has not been loaded in a previous Spell Mode Routine run as determined in S303, the spelling dictionary is loaded in S305. The spelling dictionary contains both the correct and phonetic spellings of all words included in all VWPs.

Step S307 determines if the learning mode has been activated. As discussed above, if the learning mode is activated in S307, control is sent in S309 to the Spell Mode Learning Subroutine to add new vocalizations to the dictionary.

If learning mode is not activated in S307, variables for the Spell Mode Routine are set beginning with ST in S311. ST is set to 1, and will later be used as a count of letters in a word. MORESPELL, a variable which indicates whether all characters in STRING, which was created in FIG. 6B, have been read is set to 0 in S313. Finally, TENWORD, which stores the tentatively spelled word is cleared in S315.

The Spell Mode Routine next identifies a word in the spelling dictionary by concatenating all sequential letters which have been previously stored in a character STRING up until a "space" character or until the end of the string to create a "tentative word." The concatenation process begins in S317 by reading a letter from STRING. If the letter is not a space in S319, we concatenate the letter to TENWORD in S321, the STRING length counter ST is incremented in S323, and as long as ST is not greater than STMAX in S325, another letter is read in S317.

If ST becomes greater than STMAX in S325, MORESPELL is set to "0" indicating that all words have been read and control is passed to S331. On the other hand, if a space is found in S319, MORESPELL is set to "1" in S327 to indicate that there are more words to be read and control is passed to step S331.

In S331 the word in TENWORD is checked against the spelling dictionary. If TENWORD is found in the spelling dictionary as determined in S333, the user is notified that the correct word has been identified in S337, and control is passed in S339 to the Speech Control Routine of FIG. 8.

If TENWORD is not found in the spelling dictionary in S333, the error is identified using sound and/or display in step S341. MORESPELL is then checked in S343 to determine if spelling is complete. If spelling is complete as indicated by MORESPELL=0, control is returned to the Sound Recognition Routine in S345 to await additional vocalizations. If MORESPELL=1, indicating more characters are in STRING, control is returned to S313 to check the additional words.

Figure 8:
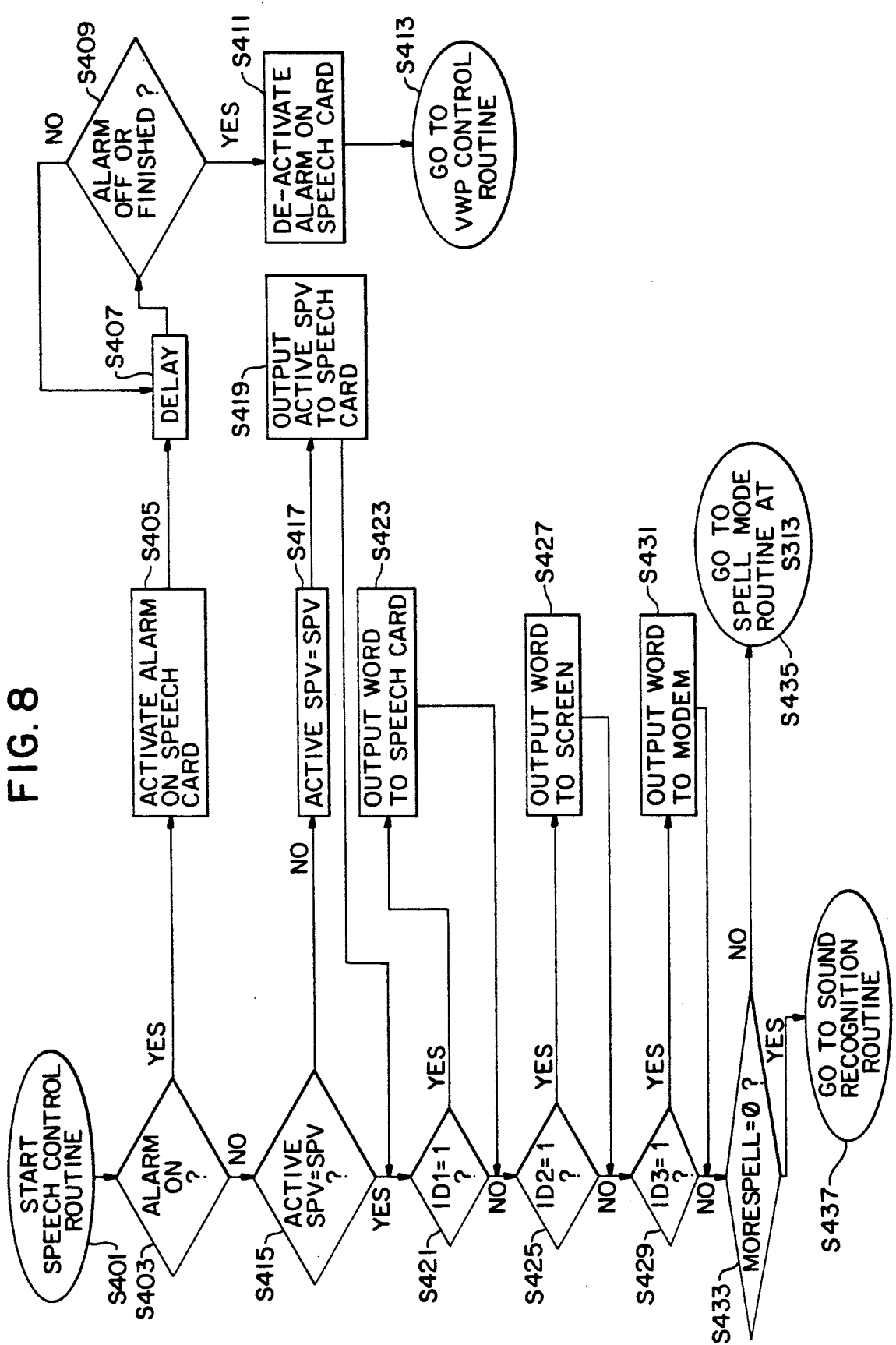
FIG. 8 shows a flow chart for the Speech Control Routine.

FIG. 8 shows a flow chart for the Speech Control Routine. The Speech Control Routine acts as an operating program for controlling peripherals such as the emergency alarm, the speech card volume setting, etc.

The Speech Control Routine begins at S401 and first checks the alarm peripheral in S403. If a red button has been set by the user, this is recognized in S403, and the alarm is activated on the speech card in S405. Keyboard entries allow setting the output of the emergency alarm volume, speed, and number of repetitions, as discussed above. Speed and repetitions are controlled by the alarm on-off check S409 in combination with a delay S407. The alarm continues repetitions until S409 determines the alarm should be turned off. S411 then deactivates the alarm on the speech card and control is returned to the VWP Control Routine by S413.

Keyboard entries in the speech control vector SPV may alter pitch, volume, and voice quality of generated speech from the speech card. The current SPV is checked against the active SPV in step S415. If there is a difference, control passes to step S417 where the active SPV is set to the currently input SPV. In step S419, the new active SPV is output to the speech card.

Keyboard entries also determine if the translated words are to be output to the speech card, to the computer screen, or to a modem. If speech output was commanded by the user setting IDI to "ON" in step S5 of the VWP control routine, control passes from step S421 to step S423 where the current word is passed to the speech card to be properly vocalized. Control passes to step S425 where it is determined if a screen output was requested by the user entering "ON" for variable ID2. If so, the output goes to the computer screen in S427. If ID3 was entered as "ON" by the user, as determined by S429, the output goes to the modem in S431.

Finally, MORESPELL, which is set by the Spell Mode Routine, is checked in S433. If MORESPELL=1, then additional words are in a STRING to be checked against the spelling dictionary, and control is returned in S435 to the Spell Mode Routine at step S313. It will be noted, referring to FIG. 7A, that ST is not initialized to "1" when control is returned to step S313. Since ST indicates the letter of the string to be read in step S317, ST properly indicates the next letter to be read. If MORESPELL=0 in step S433, then no more words are in STRING to be spelled and control is returned in S437 to the Sound Recognition Routine to await a new vocalization.

In regard to the modem control, it will be understood by those skilled in the art that the operating system can be configured so that the output from the modem can either be vocalized speech signals or ASCII characters to be input to a remote computer. Also, the modem can be an input device for word data already derived by the method of the invention at a remote location and then transmitted to a local device. In this case, the data is directed by the operating system directly to the Speech control routine and bypasses the Sound Recognition routine.

Although the invention has been described above with particularity, this was merely to teach one of ordinary skill in the art how to make and use the invention. Many modifications will fall within the scope of the invention, as that scope is defined by the following claims.

For instance, compatibility with most computers which have the necessary peripherals would allow the user to carry his "voice-word profile" and operating program on a diskette without using the portable apparatus.

What is claimed is:

1. An apparatus, comprising:
   a microphone used to receive unintelligible voice utterances from a deaf or voice-impaired person;
   a voice-word-profile containing representations of said voice unintelligible utterances and corresponding correct speech patterns;
   a sound recognition routine to match said unintelligible voice utterances to said correct speech patterns; and
   a speaker to output said correct speech patterns matched by said sound recognition routine,
   so that said apparatus corrects unintelligible speech patterns enabling a deaf or voice-impaired person to communicate in correct speech patterns by uttering otherwise unrecognizable speech pattern.

2. An apparatus as claimed in claim 1 further comprising a text display to output said correct speech patterns from said voice-word profile.

3. An apparatus as claimed in claim 1 wherein said apparatus further comprises an emergency alarm with controllable volume activated by said deaf or voice-impaired person.

4. An apparatus as claimed in claim 1 further comprising a modem for connection to a telephone to output said correct speech patterns, or to receive said voice utterances 5. An apparatus as claimed in claim 1 further comprising a connection for stationary computer to allow updating of said voice-wordprofile, said stationary computer comprising:
   a display;
   a keyboard; and
   memory and data storage capability.

6. An apparatus as claimed in claim 1 further comprising a speech card which converts said correct speech patterns to electronic signals capable of being output on said speaker and enabling said deaf or voice-impaired person to adjust speaker pitch, volume, and tone.

7. An apparatus as claimed in claim 1 wherein said microphone is attachable around said deaf or voice impaired person's neck.

8. An apparatus as claimed in claim 1 wherein said "voice-word profile" is contained on a removable diskette.

9. An apparatus as claimed in claim 1 which is pocket sized.

10. An apparatus as claimed in claim 1 wherein when said voice utterance does not match a correct speech pattern, said sound recognition routine is programmed to perform one of the following
   continue to accept a next voice utterance,
   notify said deaf or voice-impaired person of an error and accept a next voice utterance,
   prompt said deaf or voice-impaired person to repeat the unrecognized utterance until a user defined maximum number of times occur, or
   match to a correct speech pattern by allowing said deaf or voice-impaired person to vocalize an utterance corresponding to a spelling of a correct speech pattern.

11. An apparatus as claimed in claim 1 wherein said sound recognition routine identifies words with identical sounds but different spellings by a predetermined different voice utterance for each word.

12. An apparatus as claimed in claim 1 further comprising means for executing a vocalization learning routine to create additional voice-word profiles and to update said voice-word-profile by prompting said deaf or voice-impaired person to identify words and their spellings.

13. An apparatus as claimed in claim 12 further comprising:
   a spelling dictionary
   a spell mode routine using said spelling dictionary to allow said sound recognition routine to identify unrecognized words not contained in said spelling dictionary and to allow said vocalization learning routine to update said voice-word-profile by spelling words which are to be added to said voice-word-profile.

14. An apparatus as claimed in claim 1 further comprising additional voice-word-profiles wherein said sound recognition routine matches said voice utterances of each deaf or voice-impaired person to said corresponding correct speech pattern in each respective one of said additional voice-word-profiles.

15. An apparatus, comprising:
   means for receiving unrecognizable voice utterances intended as communicative speech from deaf or voice impaired persons and comparing said utterances to stored representations of said utterances, said stored representations being associated with correspondign words;
   means for identifying a match between one of said utterances and one of said stored representations of utterances, and outputting the word corresponding to the identified representation; and
   means for vocalizing said word corresponding to said identified representation so that said utterances of a deaf or voice-impaired person intended as communicative speech are output in a correct speech pattern to make them understandable.

16. A method, comprising:
   storing a voice-word-profile containign representations of unintelligible voice utterances of a deaf or voice-impaired person and a correct speech pattern corresponding to each voice utterance;
   receiving voice utterances from said deaf or voice-impaired person;
   matching said voice utterances to said correct speech patterns;
   outputting said correct speech patterns to an output device where it is vocalized,
   so that utterances of a deaf or voice-impaired person intended as communicative speech are output in a correct speech pattern to make them understandable.

17. A method, comprising:
   receiving unrecognizable voice utterances intended as communicative speech from a deaf or voice impaired person and comparing said utterances to stored representations of utterances, said stored representations being associated with corresponding words;
   identifying a match between one of said utterances and oen of said stored representations of utterances, and outputting the word corresponding to the identified representation; and
   vocalizing said word corresponding to said identified representation so that said utterances of a deaf or voice-imparied person intended as communicative speech are output in a correct speech pattern to make them understandable.

18. A method as set forth in claim 17 wherein said display is an aural display.

19. A method as set forth in claim 17 wherein said display is a visual display

* * * * *